(12) United States Patent
Edwards et al.

(10) Patent No.: US 6,477,056 B1
(45) Date of Patent: Nov. 5, 2002

(54) OPTOELECTRIC MOUNTING AND INTERCONNECT APPARATUS

(76) Inventors: Phillip J. Edwards, 6721 Positano La., San Jose, CA (US) 95138; Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 0 days.

(21) Appl. No.: 10/091,815

(22) Filed: Mar. 6, 2002

Related U.S. Application Data

(60) Provisional application No. 60/275,002, filed on Mar. 12, 2001.

(51) Int. Cl.[7] .............................. H05K 5/04; H05K 5/06
(52) U.S. Cl. ..................... 361/752; 361/800; 361/816; 361/799; 385/135
(58) Field of Search ................................ 361/752, 799, 361/816, 800, 827; 385/135, 33, 61, 71, 76, 89

(56) References Cited

U.S. PATENT DOCUMENTS

| | | | |
|---|---|---|---|
| 5,073,047 A | * 12/1991 | Suzuki et al. ............... | 257/684 |
| 5,077,819 A | * 12/1991 | Greil et al. .................... | 385/35 |
| 5,841,923 A | * 11/1998 | Kyoya .......................... | 385/33 |
| 6,072,613 A | *  6/2000 | Henningsson et al. ...... | 359/152 |

* cited by examiner

Primary Examiner—David Martin
Assistant Examiner—Hung Bui
(74) Attorney, Agent, or Firm—Parsons & Goltry; Robert A. Parsons; Michael W. Goltry

(57) ABSTRACT

Optoelectric mounting and interconnect apparatus includes housing designed to be engaged in receiving equipment. An optoelectric module is mounted in the housing and includes a ferrule with a lens assembly engaged in the ferrule along the optical axis. One end of the ferrule is formed to receive an optical fiber positioned adjacent the lens assembly and an optoelectric device is affixed to a second end of the ferrule so that light traveling along the optical axis appears at the optoelectric device. A printed circuit board is attached to the housing and electrically coupled to the optoelectric device and has external equipment connections and at least one ground potential connection. A metal can surrounds the module and the printed circuit board so as to extend from receiving equipment to external equipment.

23 Claims, 2 Drawing Sheets

OPTOELECTRIC MOUNTING AND INTERCONNECT APPARATUS

CROSS-REFERENCE TO RELATED APPLICATION

This application claims the benefit of provisional application Ser. No. 60/275,002, filed Mar. 12, 2001.

FIELD OF THE INVENTION

This invention relates to optical-to-electrical and electrical-to-optical modules and more particularly to grounding and electrical interconnects in such modules.

BACKGROUND OF THE INVENTION

In optical-to-electrical and electrical-to-optical (hereinafter "optoelectric") modules used in the various communications fields, one of the most difficult problems that must be solved is the electrical interconnection of the various components and the shielding of the module to prevent radiation into or out of the module. Providing this efficient interconnection and shielding requires very precise assembly procedures. Here it will be understood by those skilled in the art that the term "light", as used throughout this disclosure, is a generic term that includes any electromagnetic radiation that can be modulated and transmitted by optical fibers or other optical transmission lines.

Much of the optoelectric module fabrication difficulty and expense is due to mounting and shielding difficulties of optical components, such as lasers, light emitting diodes, photodiodes, etc. Generally, there are two types of lasers that are used in optoelectric modules, edge emitting lasers and surface emitting lasers. Edge emitting lasers emit light in a path parallel to the mounting surface while surface emitting lasers emit light perpendicular to the mounting surface. The light from either of the lasers must then be directed into an optical fiber for transmission to a remotely located light receiver (i.e., a photodiode or the like). Lens systems are used at both ends of the optical fiber to direct light from a light generating component into the optical fiber and to direct light from the optical fiber onto a light sensing component. The apparatus used to mount the optical components and the lens systems can have a substantial effect on the construction of the optical systems and the assembly procedures for the optical systems. Also, the mounting structure for the optical components and the lens system must be very rugged and stable so that alignment is not disturbed by use or temperature changes. Further, the entire module must be shielded from external signals and the like and to prevent radiation to other external devices or modules.

It would be highly advantageous, therefore, to remedy the foregoing and other deficiencies inherent in the prior art.

Accordingly, it is an object the present invention to provide new and improved optical component mounting and interconnect apparatus.

Another object of the present invention is to provide new and improved optical component mounting and interconnect apparatus that is rugged and stable.

Another object of the present invention is to provide new and improved optical component mounting and interconnect apparatus that is shielded to prevent radiation into and/or out of the module.

And another object of the present invention is to provide new and improved optical component mounting and interconnect apparatus that improve the fabrication efficiency and manufacturing capabilities of optoelectric modules.

Still another object of the present invention is to provide new and improved optical component mounting and interconnect apparatus that allows the use of a variety of optical components and component materials.

Still another object of the present invention is to provide new and improved component mounting and interconnect apparatus that is designed to reduce outside interference with the desired signal.

SUMMARY OF THE INVENTION

Briefly, to achieve the desired objects of the present invention in accordance with a preferred embodiment thereof, provided is optoelectric mounting and interconnect apparatus.

The apparatus includes an elongated housing having one end designed to be engaged in receiving equipment and an optoelectric module mounted in the housing. The module includes a ferrule defining an axial opening extending along an optical axis and having first and second ends positioned along the optical axis. A lens assembly is engaged in the ferrule along the optical axis. The first end of the ferrule is formed to receive an optical fiber therein such that an end of the optical fiber is positioned along the optical axis and adjacent the lens assembly and light passing through the optical fiber is acted upon by the lens assembly. Since the module may be a transmitter or a receiver, the light may be traveling out of the fiber or into the fiber. An optoelectric device is affixed to the opposite end of the ferrule so that light traveling along the optical axis appears at the optoelectric device.

A printed circuit board is attached to the housing and electrically coupled to the optoelectric device in the optoelectric module. The printed circuit board has a plurality of external electrical connections adjacent an exposed end for communicating with external equipment and at least one ground or common potential connection.

A metal can is mounted on the opposite end of the housing so as to substantially surround and shield the optoelectric module and the printed circuit board. The metal can defines an opening for receiving external equipment therein in communication with the external electrical connections of the printed circuit board.

Because of the novel construction of the optoelectric connector, a variety of different embodiments are available with only minor modifications. Examples of such embodiments are: electrically connecting the metal can directly to the chassis (generally ground) of receiving equipment and connecting the internal components to a common potential or ground through internal circuitry; electrically connecting the metal can directly to the chassis (generally ground) of receiving equipment and connecting the internal components to the metal can through a conductive sleeve and housing; electrically separating the metal can from the chassis of receiving equipment and connecting it through a conducting sleeve and housing to the internal components, which are then connected to a common potential or ground through the internal circuitry; and combinations of the above. Each of the above embodiments can be used in different applications and depend upon the specific use and operation intended as well as the receiving equipment.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
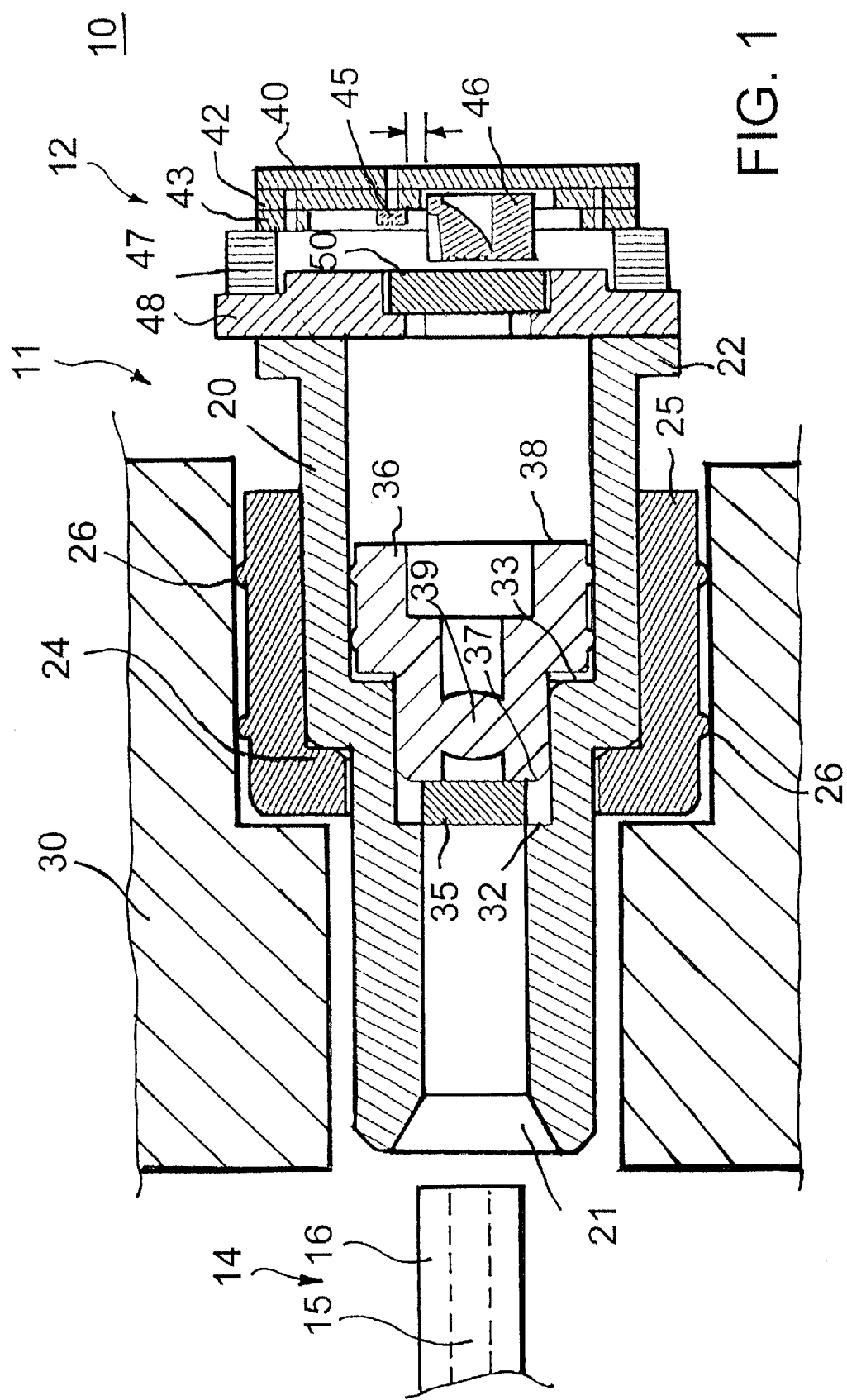
FIG. 1 is a sectional view of an optoelectric module for use in the present invention.

Referring to FIG. 1, a sectional view of either an optical-to-electrical or electrical-to-optical (hereinafter referred to as optoelectric) module 10 in accordance with the present invention. It will be understood by those skilled in the art that modules of the type discussed herein generally include a pair of channels, one of which receives electrical signals, converts the electrical signals to optical (light) beams by way of a laser or the like and introduces them into one end of an optical fiber, which then transmits the modulated optical beams to external apparatus. The second channel of the module receives modulated optical beams from an optical fiber connected to the external apparatus, conveys the modulated optical beams to a photo diode or the like, which converts them to electrical signals. In the following description, the apparatus and methods can generally be used in either of the channels but, since the optical portions of the two channels are substantially similar, only one channel will be discussed with the understanding that the description applies equally to both channels.

Module 10 of FIG. 1 includes a receptacle assembly 11 and an optoelectric package 12 aligned and affixed together, as will be disclosed in more detail below. Receptacle assembly 11 is designed to receive an optical fiber 14 in communication therewith, in a manner that will become clear presently. In the preferred embodiment, optical fiber 14 is a single mode fiber (the use of which is one of the major advantages of the present invention) including a glass core 15 and a cladding layer 16. Receptacle assembly 11 includes an elongated cylindrical ferrule 20 defining a fiber receiving opening 21 at one end and a mounting flange 22 at the opposite end.

Ferrule 20 has a radially outward directed step 24 formed in the outer periphery to operate as a stop for a resilient sleeve 25. Sleeve 25 has an inwardly directed flange formed adjacent one end so as to engage step 24 and prevent relative longitudinal movement between ferrule 20 and sleeve 25. Sleeve 25 also includes radially outwardly directed ribs or protrusions 26 in the outer periphery which are designed to frictionally engage the inner periphery of a mounting housing 30. Thus, to easily and conveniently mount module 10 in housing 30, ferrule 20 with sleeve 25 engaged thereover is press-fit into the circular opening in housing 30 and frictionally holds module 10 in place. Preferably, sleeve 25 is formed, completely or partially, of some convenient resilient material and may be electrically conductive or non-conductive as required in the specific application.

Progressing from end 21 toward end 22, ferrule 20 has two radially outwardly directed steps 32 and 33. Step 32 provides a surface or stop for the mounting of an optical spacer 35 and step 33 provides a surface or a stop for the positioning of an optical lens assembly 36. In this preferred embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. For example, in most optical modules used at the present time the optical beams are generated by a laser that operates in the infra-red band and any materials that transmit this light, including some oxides and nitrides, come within this definition.

Lens assembly 36 defines a central opening for the transmission of light therethrough from an end 37 to an opposite end 38. A lens 39 is integrally formed in the central opening a fixed distance from end 37. Lens assembly 36 is formed with radially outwardly projecting ribs or protrusions in the outer periphery so that it can be press-fit into ferrule 20 tightly against spacer 35. Thus, lens assembly 36 is frictionally held in place within ferrule 20 and holds spacer 35 fixedly in place. Also, lens 39 is spaced a fixed and known distance from spacer 35. In this preferred embodiment, optical fiber 14 in inserted into ferrule 20 so that glass core 15 buts against spacer 35, which substantially reduces or suppresses return reflections. Further, by forming spacer 35 of glass material with an index of refraction similar to the index of refraction of glass core 15, spreading of the light beam is substantially reduced and lower optical power is required to collimate the beam.

Optoelectric package 12 includes a base or support plate 40 and a mounting plate 42 positioned thereon. One or more spacer rings 43 may be positioned on plate 42 to provide sufficient distance for components mounted thereon. In this example a laser 45 is mounted on the upper surface of mounting plate 42 and positioned to transmit light generated therein to a lens block 46. Alternatively, laser 45 could be a photodiode or the like. Lens block 46 is mounted on mounting plate 42 by some convenient means, such as outwardly extending ears (not shown). A ring 47 is positioned on spacer rings 43 and a cap or cover 48 is affixed to ring 47. Generally, the entire assembly, including plate 40, mounting plate 42, spacer rings 43, ring 47 and cover 48 are fixedly attached together by some convenient means, such as welding, gluing, etc. so that laser 45 is enclosed in a hermetically sealed chamber. However, a hermetic seal is not necessary in many embodiments in which the laser or photodiode used is either separately sealed or is not sensitive to atmospheric conditions. Connections to the electrical components can be by pigtail or by coupling through plate 40.

A window 50 is sealed in cover 48 so as to be aligned with lens block 46. Lens block 46 redirects light from laser 45 at a ninety-degree angle out through window 50, which may include one or more lenses or optical surfaces. Further, window 50 is affixed to the underside of cover 48 by some convenient means, such as epoxy or other adhesive, so as to hermetically seal the light transmitting opening through cover 48. If a hermetic seal is not required, window 50 can be formed (e.g. molded) from plastic. Lens block 46 may be molded from plastic for convenience in manufacturing.

Optoelectric package 12 is affixed to receptacle assembly 11 with flange 22 of ferrule 20 butting against the upper surface of cover 48. Further, optoelectric package 12 is optically aligned with receptacle assembly 11 so that light from laser 45 is directed into core 15 of optical fiber 14. This alignment can be accomplished in different ways but one reliable method is known as active alignment. In this process, laser 45 is activated and receptacle assembly 11 is positioned approximately over optoelectric package 12. The light in optical fiber 14 is measured and the alignment is adjusted for maximum light. When maximum light is measured alignment has been achieved and receptacle assembly 11 is fixed to optoelectric package 12 by some convenient means, such as welding or adhesive.

Figure 2:
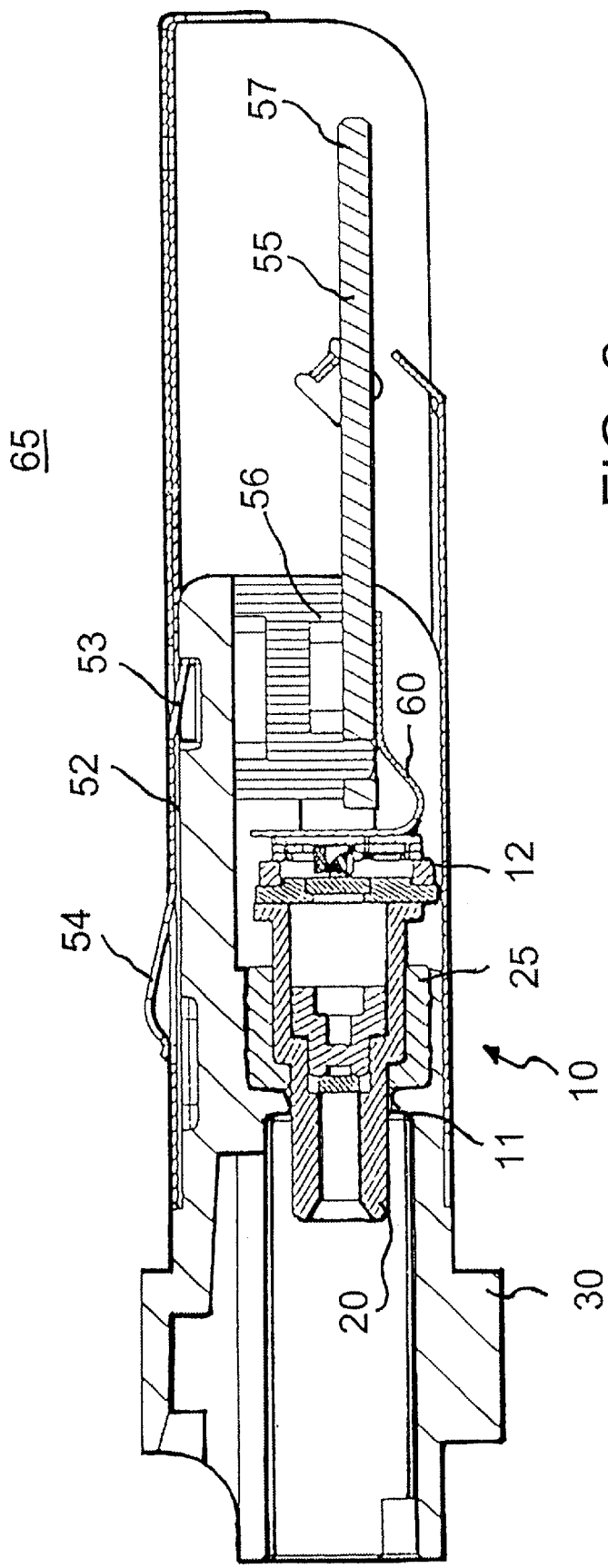
FIG. 2 is a sectional view of the optoelectric module of FIG. 1 mounted within an optoelectric connector in accordance with the present invention.

Turning now to FIG. 2, a sectional view is illustrated of the optoelectric module 10 of FIG. 1 mounted within an optoelectric connector 65 in accordance with the present invention. Housing 30 is generally designed specifically for a particular final client or for engagement with specific equipment. However, it will be understood that housing 30 can be constructed to enclose one or a pair of modules 10, one of which is a transmitter (i.e. converting received electrical signals to light) with a laser 45 in the optoelectric package and the other of which is a receiver (i.e. converting received light to electrical signals) with a photodiode in the optoelectric package. In this disclosure, only a transmitter is illustrated for convenience.

A metal can 52 is positioned in at least partially surrounding engagement with housing 30 to provide EMI shielding. In a preferred embodiment, ferrule 20 is formed radially symmetrical about the optical axis and housing 30 is formed with a substantially circular cross-section. Metal can 52 has a matching circular cross-section with an opening at one end designed to receive housing 30 therein and an opening at the opposite end for receiving external equipment. Metal can 52 includes a locking mechanism consisting of a portion 53 of the side broken inwardly to allow metal can 52 to be easily slipped over housing 30. Once metal can 52 is properly positioned over housing 30, portion 53 slides into a depression in housing 30 to prevent the withdrawal, or relative rotary movement, of housing 30 from metal can 52.

Metal can 52 is generally connected to ground or the chassis of the receiving equipment (not shown) by means of one or more spring fingers 54. In some applications it may be desirable to simply use spring fingers 54 as a locking mechanism to hold optoelectric connector 65 firmly coupled into the receiving equipment. In such applications metal can 52 may be grounded or coupled to a common potential through internal connections. For example, sleeve 25 can be formed of electrically conductive resilient material, as described briefly above. Also, in this specific application, ferrule 20 is formed of metal or other electrically conductive material and all or outer portions of the components of optoelectric package 12 (i.e. support 40, mounting plate 42, spacer rings 43, ring 47 and cover 48) are either formed of metal or electrically conductive material. By forming all or selected portions of housing 30 of electrically conductive material, metal can 52 is connected to the entire module 10 through sleeve 25. Alternatively, sleeve 25 and/or housing 30 can be non-conducting so that the entire module 10 is isolated from metal can 52.

Thus, it can be seen that the novel construction of optoelectric connector 65 allows a variety of different embodiments, including but not limited to: electrically connecting metal can 52 directly to the chassis (generally ground) of receiving equipment and connecting the internal components to a common potential or ground through internal circuitry; electrically connecting metal can 52 directly to the chassis (generally ground) of receiving equipment and connecting the internal components to metal can 52 through a conductive sleeve 25 and housing 30; electrically separating metal can 52 from the chassis of receiving equipment and connecting metal can 52 through a conducting sleeve 25 and housing 30 to the internal components, which are then connected to a common potential or ground through the internal circuitry; combinations of the above; etc. Each of the above embodiments can be used in different applications and depend upon the specific use and operation intended as well as the receiving equipment.

A printed circuit board 55 is mounted at one end on housing 30 by means of a mounting structure 56. In this disclosure the term "printed circuit board" is intended to be generic for any type of support, e.g. layered board, layered or solid sheet of ceramic, etc. An opposite end 57 of printed circuit board 55 generally carries some form of electrical connector (e.g. plug, contacts, electrical traces, etc.) for communicating with external equipment. Generally in all of the above described embodiments, printed circuit board 55 includes one or more ground or common potential connections so that optoelectric connector 65 is at the same potential as the receiving equipment. It is often undesirable to rely completely on frictional engagement between two metal surfaces (e.g. spring fingers 54 and the chassis of the receiving equipment) since wear, ambient conditions, corrosion or oxidation, and use can result in different conductive conditions between the two surfaces.

A flex circuit 60 connects circuitry (e.g. drivers, amplifiers, etc.) on printed circuit board 55 to contacts on the bottom surface of support plate 40. The contacts on the bottom surface are in communication with components (e.g. lasers, photo-diodes, monitor diodes, etc.) on the upper surface to provide power and conduct signals between the components mounted on mounting plate 42 and circuit board 55. In some applications some of the circuits (e.g. drivers, modulators, amplifiers, etc.) may be mounted on mounting plate 42 and flex circuit 60 is then used to connect these circuits to additional circuits on circuit board 55.

It should be noted that once optoelectric connector 65 is correctly positioned in, for example, the chassis of receiving equipment, metal can 52 is positioned to extend at least partially into the receiving equipment. Also, when external equipment is connected to the electrical connector at end 57 of printed circuit board 55 the opening in metal can 52 is substantially closed so that optoelectric package 12 and circuit board 55 are substantially completely surrounded and EMI shielded.

Accordingly, new and improved mounting and interconnect features are disclosed which substantially reduce time and effort in assembly and which improve the efficiency of optical systems. Thus, manufacturing tolerances can be substantially reduced, substantially reducing manufacturing time, labor, and costs. Further, the new and improved mounting and interconnect features allow the use of a variety of components and component materials and the optoelectric apparatus effectively shields the circuits and components from EMI.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

What is claimed is:

1. Optoelectric mounting and interconnect apparatus comprising:
   an elongated housing having one end designed to be engaged in receiving equipment and an opposite end;
   an optoelectric module mounted in the housing and including a ferrule defining an axial opening extending along an optical axis and having first and second ends positioned along the optical axis, a lens assembly engaged in the ferrule along the optical axis, the first end of the ferrule being formed to receive an optical fiber such that an end of the optical fiber is positioned along the optical axis and adjacent the lens assembly and light passing through the optical fiber is acted upon by the lens assembly, and an optoelectric device affixed to the second end of the ferrule so that light traveling along the optical axis appears at the optoelectric device;

a printed circuit board attached to the housing and electrically coupled to the optoelectric device in the optoelectric module, the printed circuit board having a plurality of external electrical connections for communicating with external equipment and at least one ground or common potential connection; and a metal can mounted on the opposite end of the housing so as to substantially surround and shield the optoelectric module and the printed circuit board, the metal can defining an opening for receiving external equipment therein in communication with the external electrical connections of the printed circuit board.

2. Optoelectric mounting and interconnect apparatus as claimed in claim 1 wherein the optoelectric module is mounted within the housing by means of a sleeve engaged over an outer periphery of the ferrule and frictionally engaged between the optoelectric module and the housing.

3. Optoelectric mounting and interconnect apparatus as claimed in claim 2 wherein the housing, the sleeve, and the optoelectric module include electrically conductive portions for electrically coupling the metal can to the optoelectric module.

4. Optoelectric mounting and interconnect apparatus as claimed in claim 3 wherein ferrule includes conductive material for coupling a cladding layer of the optical fiber to the metal can.

5. Optoelectric mounting and interconnect apparatus as claimed in claim 2 wherein the sleeve is formed of non-electrically conductive material.

6. Optoelectric mounting and interconnect apparatus as claimed in claim 5 wherein the ferrule includes conductive material for coupling a cladding layer of the optical fiber to the at least one ground or common potential connection of the printed circuit board.

7. Optoelectric mounting and interconnect apparatus as claimed in claim 1 wherein the printed circuit board is electrically coupled to the optoelectric device by a flex circuit having one end connected to a surface of the optoelectric module and a second end connected to the printed circuit board.

8. Optoelectric mounting and interconnect apparatus as claimed in claim 1 wherein the optoelectric device is mounted in an electrically conductive package affixed to the second end of the ferrule, the package including a window for the passage of light and electrical connections on an external surface coupled to the optoelectric device.

9. Optoelectric mounting and interconnect apparatus as claimed in claim 8 further including a flex circuit electrically coupling the printed circuit board to the optoelectric device, the flex circuit having one end connected to electrical connections on the external surface of the package and a second end connected to the printed circuit board.

10. Optoelectric mounting and interconnect apparatus as claimed in claim 1 wherein the ferrule is formed radially symmetrical about the optical axis and the housing is formed with a generally circular cross-section.

11. Optoelectric mounting and interconnect apparatus as claimed in claim 10 wherein the metal can is formed with a circular cross-section and an opening adjacent one end with a portion of the housing therein and the opening for receiving external equipment in connection with the printed circuit board adjacent an opposite end.

12. Optoelectric mounting and interconnect apparatus as claimed in claim 10 wherein the metal can is designed to extend from the receiving equipment to external equipment received in the opening.

13. Optoelectric mounting and interconnect apparatus comprising:

an elongated housing having one end designed to be engaged in receiving equipment and an opposite end;

an optoelectric module mounted in the housing and including a ferrule defining an axial opening extending along an optical axis and having first and second ends positioned along the optical axis, a lens assembly engaged in the ferrule along the optical axis, the first end of the ferrule being formed to receive an optical fiber such that an end of the optical fiber is positioned along the optical axis and adjacent the lens assembly and light passing through the optical fiber is acted upon by the lens assembly, and an optoelectric device affixed to the second end of the ferrule so that light traveling along the optical axis appears at the optoelectric device;

a printed circuit board attached to the housing and electrically coupled to the optoelectric device in the optoelectric module, the printed circuit board having a plurality of external electrical connections for communicating with external equipment and at least one ground or common potential connection; and an elongated metal can, the metal can defining an opening adjacent one end with a portion of the housing therein so as to substantially surround and shield the optoelectric module and the printed circuit board and an defining an opening adjacent an opposite end for receiving external equipment in connection with the printed circuit board, the metal can being designed to extend from the receiving equipment to external equipment received in the opening.

14. Optoelectric mounting and interconnect apparatus as claimed in claim 13 wherein the optoelectric module is mounted within the housing by means of a sleeve engaged over an outer periphery of the ferrule and frictionally engaged between the optoelectric module and the housing.

15. Optoelectric mounting and interconnect apparatus as claimed in claim 14 wherein the housing, the sleeve, and the optoelectric module include electrically conductive portions for electrically coupling the metal can to the optoelectric module.

16. Optoelectric mounting and interconnect apparatus as claimed in claim 15 wherein ferrule includes conductive material for coupling a cladding layer of the optical fiber to the metal can.

17. Optoelectric mounting and interconnect apparatus as claimed in claim 14 wherein the sleeve is formed of non-electrically conductive material.

18. Optoelectric mounting and interconnect apparatus as claimed in claim 17 wherein the ferrule includes conductive material for coupling a cladding layer of the optical fiber to the at least one ground or common potential connection of the printed circuit board.

19. Optoelectric mounting and interconnect apparatus as claimed in claim 13 wherein the printed circuit board is electrically coupled to the optoelectric device by a flex circuit having one end connected to a surface of the optoelectric module and a second end connected to the printed circuit board.

20. Optoelectric mounting and interconnect apparatus as claimed in claim 13 wherein the optoelectric device is mounted in an electrically conductive package affixed to the second end of the ferrule, the package including a window for the passage of light and electrical connections on an external surface coupled to the optoelectric device.

21. Optoelectric mounting and interconnect apparatus as claimed in claim 20 further including a flex circuit electrically coupling the printed circuit board to the optoelectric device, the flex circuit having one end connected to electrical connections on the external surface of the package and a second end connected to the printed circuit board.

22. Optoelectric mounting and interconnect apparatus as claimed in claim 13 wherein the ferrule is formed radially symmetrical about the optical axis and the housing is formed with a generally circular cross-section.

23. Optoelectric mounting and interconnect apparatus comprising:

an elongated housing having one end designed to be engaged in receiving equipment and an opposite end, the housing being formed with a generally circular cross-section;

an optoelectric module including a ferrule defining an axial opening extending along an optical axis and having first and second ends positioned along the optical axis, the ferrule being radially symmetrical about the optical axis, a lens assembly engaged in the ferrule along the optical axis, the first end of the ferrule being formed to receive an optical fiber such that an end of the optical fiber is positioned along the optical axis and adjacent the lens assembly and light passing through the optical fiber is acted upon by the lens assembly, and an optoelectric device affixed to the second end of the ferrule so that light traveling along the optical axis appears at the optoelectric device;

a sleeve engaged over an outer periphery of the ferrule and mounting the optoelectric module within the housing by frictionally engaging the sleeve between the optoelectric module and the housing;

a printed circuit board attached adjacent one end to the housing and electrically coupled to the optoelectric device in the optoelectric module, the printed circuit board having a plurality of external electrical connections adjacent an opposite end for communicating with external equipment and at least one ground or common potential connection; and an elongated metal can having a circular cross-section, the metal can defining an opening adjacent one end with a portion of the housing therein so as to substantially surround and shield the optoelectric module and the printed circuit board and defining an opening adjacent an opposite end for receiving external equipment in connection with the printed circuit board, the metal can being designed to extend from the receiving equipment to external equipment received in the opening.

* * * * *